UNITED STATES PATENT OFFICE.

JAMES HARGREAVES AND THOMAS ROBINSON, OF WIDNES, ENGLAND.

IMPROVEMENT IN THE MANUFACTURE OF SULPHATES OF SODA AND POTASSA.

Specification forming part of Letters Patent No. 149,859, dated April 21, 1874; application filed March 24, 1874.

*To all whom it may concern:*

Be it known that we, JAMES HARGREAVES, of Widnes, in the county of Lancaster, England, analytical chemist, and THOMAS ROBINSON, of the same place, iron-founder, have invented an Improved Method of Manufacturing Sulphates of Soda and Potassa, of which the following is a specification:

In carrying our invention into effect we proceed as follows, that is to say: We produce sulphurous acid by the combustion of sulphur, sulphide of hydrogen, pyrites, other compounds of sulphur, or any of them. To the sulphurous acid we add atmospheric air, in sufficient quantity to convert the sulphurous acid into sulphuric acid. We also add water, or the vapor thereof, to the aforesaid mixture of sulphurous acid and atmospheric air. The said mixture of sulphurous acid, atmospheric air, and water-vapor is then drawn or forced through or among chloride of sodium or chloride of potassium, or either of them, contained in any suitable chamber or vessel. Sulphate of soda or sulphate of potassa is or are formed by the decomposition of the said chloride of sodium or chloride of potassium. We prefer to maintain the temperature of the aforesaid mixture of sulphurous acid, atmospheric air, and water-vapor, when being drawn or forced through or among the said chloride of sodium or chloride of potassium, or either of them, at a temperature slightly below the melting-points of the chloride of sodium or chloride of potassium, or either of them, which are being subjected to the action of the said mixture of sulphurous acid, atmospheric air, and water-vapor; but we do not confine ourselves to the aforesaid temperature. The conversion of chloride of sodium into sulphate of soda, and of chloride of potassium into sulphate of potassa, takes place at lower temperature, but not so rapidly. The hydrochloric acid liberated from the said chlorides, or either of them, is condensed by any suitable means. When we wish to produce a more rapid conversion of the said sulphurous acid into sulphuric acid, we add nitric acid or nitric oxide to the said mixture of sulphurous acid, atmospheric air, and water-vapor; or we add nitric acid or a nitrate to the said chlorides, or either of them. We prefer to add nitrate of soda when making sulphate of soda, and nitrate of potassa when making sulphate of potassa. We use air-pumps, steam-jets, or centrifugal fans, chimney-draft, or other suitable means to force or draw the said mixture of sulphurous acid, atmospheric air, and water-vapor through or among the said chlorides, or either of them, and the same instruments or means to force or draw the required atmospheric air through or among burning sulphur, pyrites, or other compounds of sulphur, to effect the combustion of the said sulphur or compounds thereof, or any of them. When necessary, we superheat the air which is used to effect the combustion of sulphur or compounds thereof. We also superheat the air and water-vapor mixed with the said sulphurous acid, and we do so either before, during, or after the admixture.

And now having described our said invention, and set forth the means whereby the same is to be carried into effect, we claim—

1. The method of producing sulphate of soda and sulphate of potassa, by forcing or drawing sulphurous acid, air, and water-vapor through or among chloride of sodium or chloride of potassium, substantially as herein set forth.

2. In the manufacture of sulphate of soda or potassa, superheating the air and water-vapor, or either of them, previous to, during, or after admixture with the sulphurous acid, substantially as herein set forth.

JAMES HARGREAVES.
THOMAS ROBINSON.

Witnesses:
J. KING,
GEO. LANDER.